No. 640,638. Patented Jan. 2, 1900.
A. C. DIEHL.
HOSE COUPLING.
(Application filed Oct. 5, 1899.)
(No Model.) 2 Sheets—Sheet 1.
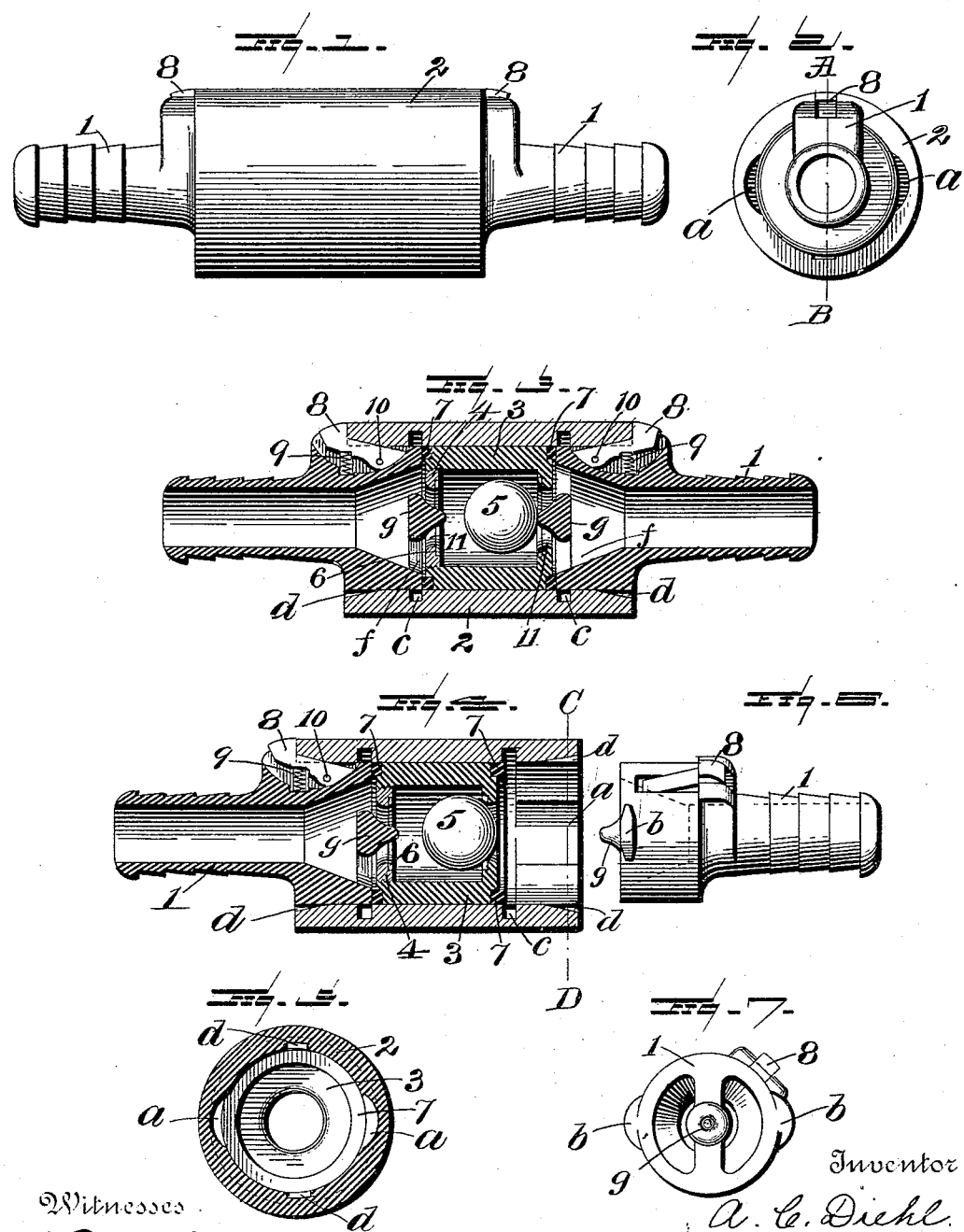

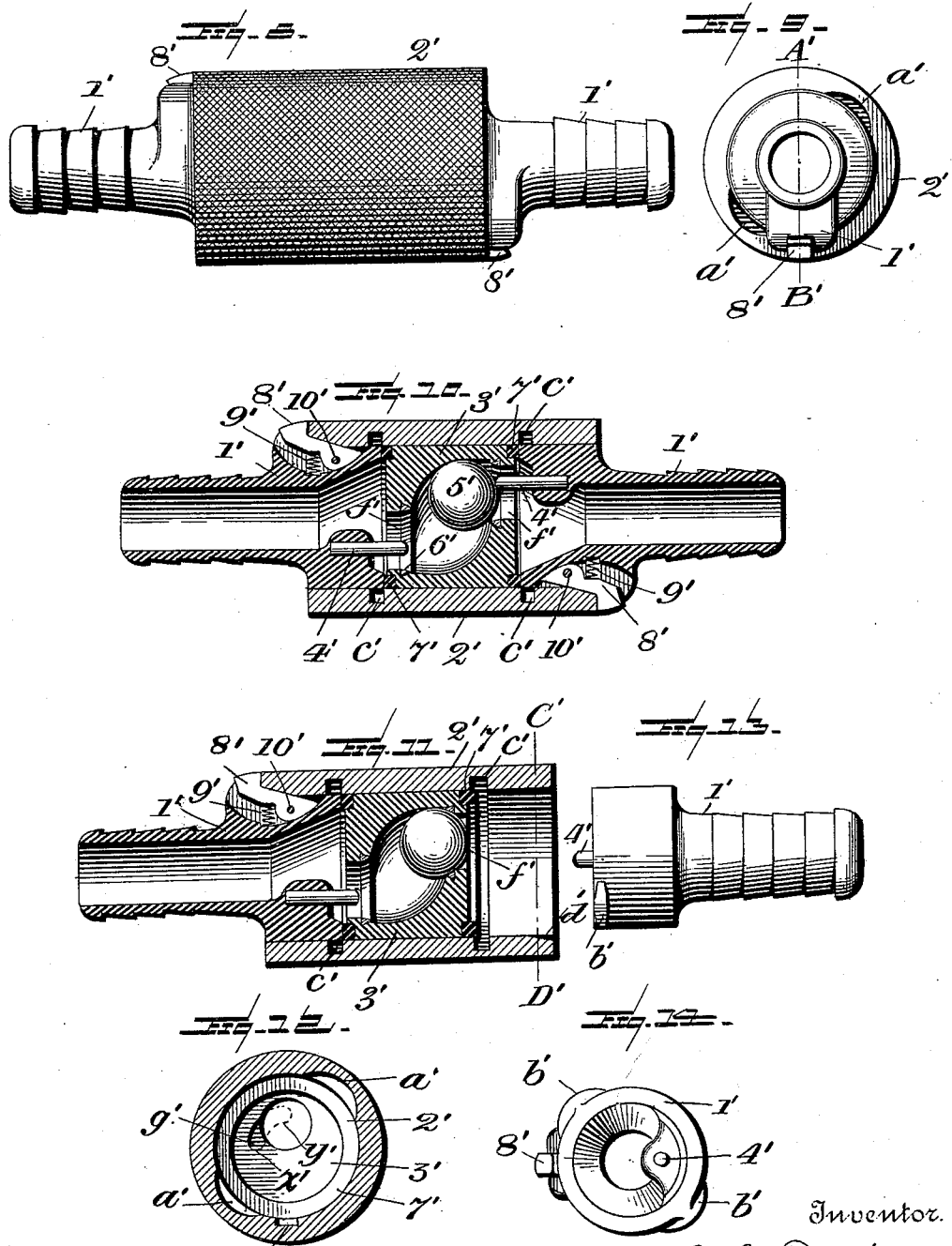

UNITED STATES PATENT OFFICE.

ALBERT C. DIEHL, OF PHILADELPHIA, PENNSYLVANIA.

HOSE-COUPLING.

SPECIFICATION forming part of Letters Patent No. 640,638, dated January 2, 1900.

Application filed October 5, 1899. Serial No. 732,691. (No model.)

*To all whom it may concern:*

Be it known that I, ALBERT C. DIEHL, a citizen of the United States, residing at Philadelphia, in the county of Philadelphia and State of Pennsylvania, have invented certain new and useful Improvements in Hose-Couplings; and I do hereby declare the following to be a full, clear, and exact description of the invention, such as will enable others skilled in the art to which it appertains to make and use the same.

My invention relates to improvements in hose-couplings, more especially to that class of hose-couplings in which a ball-valve is employed to prevent the escape of air, steam, or other fluid when the coupling is uncoupled.

In order to more fully describe my invention, reference will be had to the accompanying drawings, in which—

Figure 1 represents a side elevation of my improved coupling. Fig. 2 represents an end elevation of the same. Fig. 3 represents a section on the line A B in Fig. 2. Fig. 4 represents a section taken on the line A B in Fig. 2, showing one end of the hose removed. Fig. 5 represents a section taken on the line C D in Fig. 4. Fig. 6 represents one of the hose ends in side elevation. Fig. 7 represents the same in end elevation. Fig. 8 represents a side elevation of a modified form of my coupling. Fig. 9 is an end elevation of the same. Fig. 10 is a section on the line A' B' in Fig. 9. Fig. 11 is a similar section showing one of the hose ends removed. Fig. 12 is a section on the line C' D' in Fig. 11. Fig. 13 is a side elevation of one of the hose ends, and Fig. 14 is an end elevation of the same.

Similar letters and numerals refer to similar parts throughout the several views.

My improved coupling consists of two hose ends 1, having two projecting lugs $b$ on their larger ends and having attached to each, as at 10, a latch 8, upon which a spring 9 normally acts to force outward.

2 represents a hollow sleeve having an annular internal groove $c$ near either end of its ends and two notches $d$ in each end, also two passages $a$ in each end, which lead into said annular grooves $c$. Into this sleeve 2 is forced a valve-box 3, which becomes practically a part of the sleeve. This valve-box is hollow and capped at its open end 4. Through both ends of the valve-box a hole 11 is drilled, around the edge of which a valve-seat packing-ring 6 is forced and against which the steel ball-valve 5, contained in the valve-box 3, seats itself to cut off the flow of fluid.

A plug $g$ extends across the inner ends of the hose ends, and when the said hose ends are inserted in the sleeve 2 the plug $g$ extends into the opening at the end of the valve-box and lifts the ball-valve off its seat.

The action of the coupling is as follows: The hose end 1 being fastened in the hose and the sleeve 2, containing the valve-box 3 and the ball-valve 5, connected with the hose end, as shown in Fig. 3, the fluid under pressure coming through the hose in the hose end 1 enters the valve-box 3 by the passage $f$ through the valve-seat and forces the valve against the opposite valve-seat, thus closing the passage and preventing the escape of fluid. A second hose end, which is a duplicate of the first, is fastened into the hose which is to be connected. To make the coupling, the end of the loose piece of hose having the hose end 1 fastened therein is brought into line with the sleeve 2, the position of which with regard to the hose end 1 is such that the lugs $b$ will pass through the opening $a$ into the annular groove $c$, when by turning the loose hose end the latch 8 will catch into the notch $d$, thus locking the coupling. As the hose end 1 is pushed into the sleeve 2 the plug $g$ forces the ball-valve 5 off its seat 6, thus allowing the fluid to pass through the opening $f$ into the new section of hose. To uncouple the joint, the latch 8 is depressed until it will allow the hose end 1 to be turned. The end is then turned until the lug $b$ registers with the opening $a$, when the hose end 1 may be pulled out. As the hose end 1 is drawn out the fluid presses the ball-valve 5 against the seat 6, thus closing the passage and stopping the flow.

The modification shown in Figs. 8 to 14 differs from the construction shown in Figs. 1 to 7, inclusive, in some respects, which will be apparent, as follows: The hose ends 1', provided with two projecting lugs $b'$ on the larger ends and having attached to each, as at 10', the latch 8', upon which a spring 9' acts, tending to force the latch outward, (illustrated in Figs. 10 and 11,) are all practically the same as the construction shown in Figs. 3 and 4. The hollow sleeve 2' has an annular internal groove c' near either of its ends and a notch d' in each end and also two passages a' in each end which lead into the annular groove c'. In this sleeve is forced the valve-box 3', which becomes practically one piece with the sleeve. This valve-box is hollow and capped at its open end; but the construction thereof differs somewhat from the valve-box 3, (shown in Figs. 3 and 4,) and it is in connection with this principally that the difference lies. Through each end of the valve-box 3' a hole is drilled, which forms the passage f'. These holes are drilled eccentric to the center of the valve-box and are diametrically opposite each other. Around the edges of the said holes a valve-seat packing-ring 6' is forced and against which the steel ball-valve 5', contained in the valve-box 3', seats itself to cut off the flow of fluid. A pin 4' is fastened eccentric in each of the hose ends 1' in such position that when the hose ends are inserted in the sleeve 2' the pin 4' will rest in the position x' (see Fig. 12) in the groove g' in the valve-box 3'. Then by turning the hose end 1' the pin 4' will move to the position y', Fig. 12, which is near the center of the passage f'. The action of the coupling in this instance is as follows: The hose end 1' being fastened in the hose, and the sleeve 2', contained in the valve-box 3', connected with the hose end 1', as shown in Fig. 11, the fluid under pressure coming through the hose and the hose end 1 enters the valve-box 3' by the passage f' in the valve-seat and forces the valve against the opposite seat, thus closing the passage and preventing the escape of fluid, as hereinbefore described with reference to Figs. 1 to 7. A second hose end, which is a duplicate of the first, is fastened into the hose which is to be connected. To effect a coupling, the loose piece of hose, having the hose end 1' fastened therein, is brought into line with the sleeve 2', the position of which with regard to the hose end 1' is such that the lugs b' will pass through the openings a' into the annular groove c' and the pin 4' into the groove g', when by turning the hose end the latch 8' will catch in the notch d', thus locking the coupling. As the hose end 1' is turned the pin 4' moves from its position x' into the groove g' to the position y' in the passage f'. In so doing the pin 4' comes in contact with the ball-valve 5' and forces the same off its seat, thus allowing the fluid to pass through the passage f' into the new section of hose. To disconnect the coupling, the latch 8' is depressed until it will allow the hose end 1' to be turned. The end is then turned until the lug b' registers with the passage a', when the hose end may be pulled out. As the hose end 1' is turned the pin 4' moves from the position y' in the passage f' to the position x' in the groove g', allowing the ball-valve 5' to assume its original position, closing the passage f' and cutting off the flow of fluid.

In some respects the form of coupling shown in Figs. 8 to 14 is advantageous over the coupling shown in Figs. 1 to 7, and this advantage resides chiefly in the fact that the lugs b' engage in the annular groove c' before the valve opens, thus making the operation of coupling and uncoupling much easier and overcoming the tendency which the pressure has in the latter form of forcing the loose end out.

I do not wish to limit myself to the precise details hereinbefore described and as shown in the drawings, as many modifications might be made without departing from the spirit of my invention.

Having thus fully described my said invention, what I claim, and desire to secure by Letters Patent of the United States, is—

1. In a hose-coupling, the combination with a sleeve, of two hose ends inserted in said sleeve; a valve-box having openings at each end carried within said sleeve and between said hose ends; a valve carried within said valve-box adapted to close one of said openings when one of said hose ends is removed from said casing; substantially as described.

2. In a hose-coupling, the combination with a sleeve, a hose end inserted in each end of said sleeve; means for securing said hose ends in said sleeve; a valve-box carried in said sleeve between said hose ends, and provided with openings at each end; a ball-valve carried within said valve-box adapted to close one of said openings when either of said hose ends is removed; substantially as described.

3. In a hose-coupling, the combination with a sleeve, a hose end inserted in each end of said sleeve, projecting lugs on said hose ends, latches mounted in said lugs and adapted to secure said ends in said sleeve; a valve-box carried within said sleeve; a valve mounted in said valve-box adapted to stop the passage of fluid through the said valve when either of said hose ends is removed; substantially as described.

4. In a hose-coupling, the combination with a sleeve, a hose end inserted in each end of said sleeve; means for securing the hose ends in said sleeve; a valve-box carried in said sleeve between the said hose ends; a ball-valve mounted in said valve-box; a plug extending from the inner end of said hose ends and into said valve-box; substantially as described.

5. In a hose-coupling, the combination with a sleeve, a hose end inserted in each end of said sleeve; lugs carried by said hose ends; latches mounted in said lugs and securing said hose ends in said casing; a valve-box carried within said casing and between the ends of said hose ends; said valve-box having an opening at each end and a valve-seat surrounding said opening; a ball-valve carried within said valve-box; plugs extending from the inner ends of said hose ends adapted to enter the openings at each end of said valve-box; substantially as described.

6. In a hose-coupling, the combination with a casing provided with internal annular grooves, one near each end thereof, and a slot near each end of said casing leading into the groove at that end; a hose end inserted in each end of said casing; said hose end being provided with a lug which is adapted to fit into said annular groove and pass through said slot; a valve-box carried within said casing; and a valve carried within said valve-box; substantially as described.

7. In a hose-coupling, the combination with a casing provided near each end with an internal annular groove and a slot leading from the end of said casing into said groove; a hose end inserted in each end of said casing, said hose end being provided with a lug adapted to fit into said annular groove and to pass through said slot; a valve-box having an opening at each end and carried within said casing; a ball-valve carried within said valve-box; and means for unseating said valve when the hose ends are inserted in said casing; substantially as described.

8. In a hose-coupling, the combination with a casing provided near each end with an internal annular groove and a slot leading from the end of said casing into said groove; a hose end inserted in each end of said casing and provided with a lug, which is adapted to fit in said annular groove and to pass through said slot; a latch carried by said hose end and adapted to lock the same in said casing; a valve-box carried within said casing; a valve carried within said valve-box; and means for unseating said valve when the hose ends are inserted in said casing; substantially as described.

In testimony whereof I affix my signature in presence of two witnesses.

ALBERT C. DIEHL.

Witnesses:
 E. M. LAUGHLIN,
 A. H. TAYLOR.